United States Patent [19]

Miller

[11] 4,346,737

[45] Aug. 31, 1982

[54] DRIP IRRIGATION TUBING

[75] Inventor: Robert J. Miller, Five Points, Calif.

[73] Assignee: The Regents of the University of California, Berkeley, Calif.

[21] Appl. No.: 94,805

[22] Filed: Nov. 15, 1979

[51] Int. Cl.³ ............................................. B05B 15/00
[52] U.S. Cl. ...................................... 138/42; 239/542
[58] Field of Search ................. 138/42, 103; 239/542, 239/547

[56] References Cited

U.S. PATENT DOCUMENTS 4,009,832 3/1977 Tiedt ................................. 239/542

4,047,995 9/1977 Leal-Diaz ........................... 239/542

Primary Examiner—Steven L. Stephan
Attorney, Agent, or Firm—Lothrop & West

[57] ABSTRACT

For use in drip irrigation, a tube of flexible material such as plastic is comprised of an elongated strip having first and second side edges. The strip is rolled on itself with the edges parallel and with the interior of one side edge secured longitudinally to the exterior of the strip well spaced from the other side edge. This leaves an interior flap free of but closely spaced from the interior of the tube. There is a series of relatively large holes through the tube overlying the flap.

2 Claims, 2 Drawing Figures

DRIP IRRIGATION TUBING

BRIEF SUMMARY OF THE INVENTION

Primarily for use in carrying low pressure irrigation water to the ground surrounding the base of plants, there is provided a flexible tube, preferably made of material rolled upon itself and longitudinally sealed alongside a series of holes or openings through the outer wall of the tube. The material of the tube is assembled in a form spiral in cross-section. Part of the material follows along the major portion of the tube interior to afford a relatively loose interior flap over the holes or openings. Water within the tube exudes between the outer surface of the flap and the inner surface of the tube and finally escapes from the tube through the perforations or holes. The tube is sealed longitudinally in any suitable fashion to preclude water leakage.

DETAILED DESCRIPTION

Figure 1:
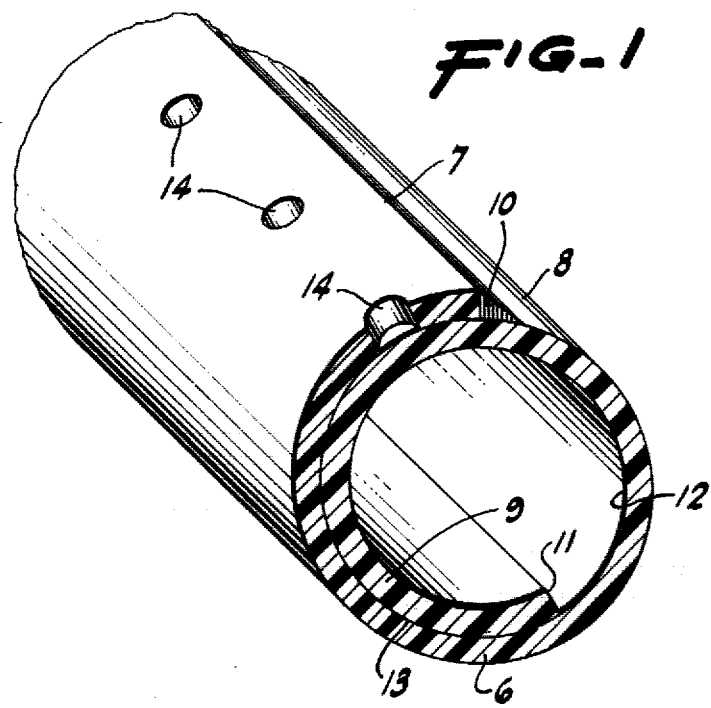
FIG. 1 is an isometric view, portions being broken away, a drip of irrigation tube constructed pursuant to the invention in one fashion.

The form of drip irrigation tubing or tube shown particularly in FIG. 1 is preferably fabricated by utilizing a strip 6 or sheet or wall of a suitable, relatively thin, (i.e. uniformly thick) flexible material such as polyethylene film. Conveniently this is approximately eight to ten mils in thickness, extends longitudinally to any desired length, and extends transversely to any width sufficient to result in a tube or conduit of approximately circular cross-section and one-half of an inch or more internal diameter when completed. One part of the single strip or film 6 or sheet is rolled or "folded" upon itself in a transverse direction, spirally in transverse cross-section, so that one or a first side edge 7 overlaps an intermediate portion 8 of the resulting rolled tube or conduit. The remaining portion of the single sheet forms or leaves an inner flap 9 over and against a portion of the interior of the tube or conduit. A heat sealer or comparable device is run along the length of the first side edge 7, so that some of the polyethylene film is softened or melted and merged with adjacent film. This affords a seam 10 that is continuous and is watertight.

The other, second side edge 11 on the flap 9 along with the remaining part of the now-curved flap 9 resulting from the originally flat polyethylene strip or sheet is allowed to lie loosely within and substantially against the interior surface 12 of the tube or conduit so formed. There results a radially very small passageway 13 between the inner flap 9 and the outer tube wall 6. This passageway 13 leads from the interior toward the other, sealed edge 7 of the tube.

Preferably, the tube adjacent to but spaced transversely a predetermined distance from the edge 7 is provided at appropriate longitudinal intervals with a number of apertures 14 or holes of any desired diameter or area. Preferably, these are much larger than customary and are approximately of one-eighth to three-sixteenths of an inch in diameter. The series of holes or apertures 14 extends for substantially the entire length of the finished tube.

For use, the device of this sort is preferably closed at the far end and at the near end is connected to a source of irrigation water under a modest pressure; for example, from two to eight pounds per square inch. Water thus enters the interior of the tube and, being otherwise confined therein, finds its only escape by flowing through the narrow, relatively long, spiral space 13 between the inner flap 9 and the outer wall 6. The water so travelling is somewhat throttled, then finally encounters the openings or holes 14 and travels through them onto the ground. The pressure of the water has some influence on the size of the straining and throttling passageway 13 through which it must flow in order to escape finally from the holes 14. The user adjusts the situation to afford the desired amount of water efflux.

This construction, although allowing the water to escape, employs the nearly capillary passage 13 as a barrier or sieve or strainer to block particles of substantial size in the water from further flow. These particles cannot get as far along as the openings 14 and perhaps clog them. Furthermore, the throttling being done by the passageway 13, the openings 14 themselves are not used to throttle, and so instead of being very small can be of a relatively large free-flowing size. Particles being stopped or tending to stop adjacent the entrance to the passageway 13 can shift longitudinally so the entire length of such opening can serve to block large particles. This is much more strainer effect than is usual.

By the use of a tube of this sort, it is possible to maintain clean and clear openings 14 throughout substantially the entire length of the tube and thus to continue uninterruptedly the desired drip irrigation over a protracted period. Additionally, since a filtering or straining effect is built into the tube itself, it is not necessary also to provide an elaborate filtering or straining system in advance of the tube entrance.

Figure 2:
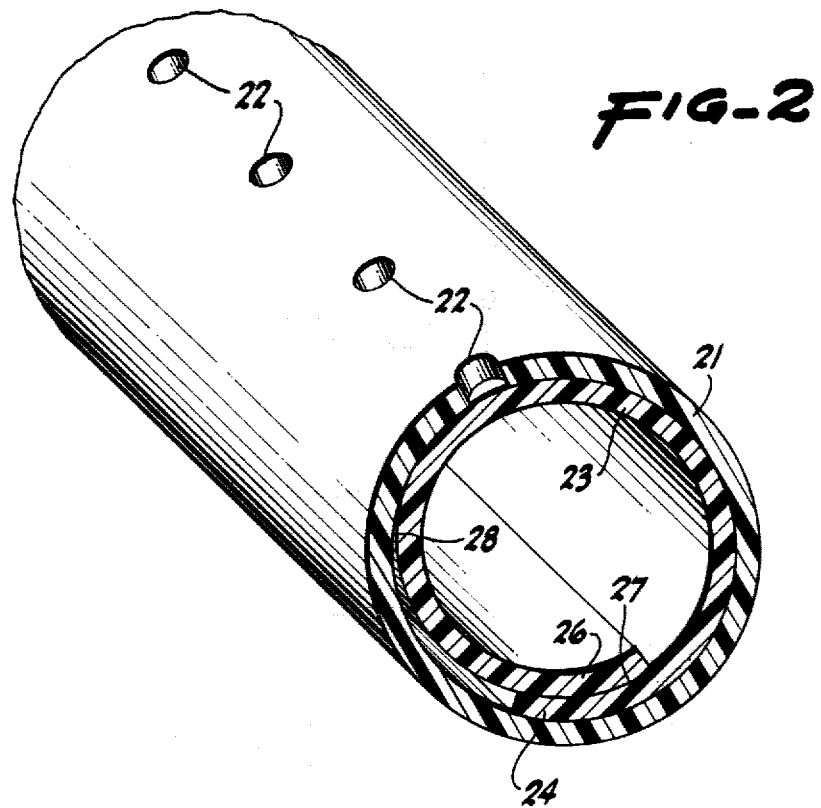
FIG. 2 is an isometric view of another form of drip irrigation tube constructed pursuant to the invention.

Under some circumstances, a somewhat more rugged arrangement is preferred. As shown in FIG. 2, it is occasionally advantageous to provide a continuous outer tube 21 of substantially ordinary construction and, for example, made of polyethylene or comparable material. This tube 21 is pierced at appropriate intervals with holes or openings 22 comparable to the openings 14. In this instance, there is provided within the continuous outer tube 21 an interior strip 23 of comparable material arranged with the edges 24 and 26 of such strip overlapping each other. The strip 23 occupies a relatively snug relationship with the interior wall of the tube 21. When water under some pressure is admitted to the interior of this arrangement, that water finds its way out only by travelling in the relatively small space 27 between the overlapped portion 26 and the main body 24 of the interior strip. That water then traverses the relatively small space 28 between the interior spiral strip 23 and the external tube 21, escaping finally through the holes 22 substantially as before.

With the use of either of these devices, it is possible to provide exactly the desired amount and nature of drip irrigation over a protracted period without the use of an advanced filter or strainer arrangement and with the use of relatively inexpensive standard irrigation materials.

I claim:

1. A method of forming a drip irrigation tube comprising the steps of providing a longitudinally elongated planar sheet of flexible material having parallel first and second longitudinal side edges, and a longitudinally extending series of holes defined therethrough parallel to said first side edge and in adjacent spaced relation thereto, transversely spiralling said sheet of flexible material on itself to define a longitudinally extending conduit of approximate circular transverse cross-section, the portion of the sheet of flexible material adjacent second side edge being positioned interiorly of the formed conduit in underlying relation to said first side edge and extending in underlying relation to the defined series of holes and for a substantial distance therebeyond to define a freely positioned flap within the formed conduit, and directly sealing said first side edge to the immediately underlying portion of the formed conduit along the full length of said first edge.

2. In a drip irrigation conduit, an elongated water transmitting irrigation tube of generally circular transverse cross-section, said tube having a series of water discharge holes defined therethrough longitudinally therealong, and an elongated sheet of flexible material transversely rolled and positioned interiorly within said tube in engagement with the inner surface of said tube peripherally thereabout, said sheet being independent of said tube and including opposed longitudinal edges positioned in overlapped relation to each other peripherally remote from the holes defined through the tube whereby a flow restricting passageway is formed between the overlapped edges and between the interior sheet and the tube from the edges of the sheet to the openings.

* * * * *